（12）United States Patent
Le

(10) Patent No.: US 9,141,949 B1
(45) Date of Patent: Sep. 22, 2015

(54) POINT OF SALE TRANSACTION DEVICE

(71) Applicant: Travis Q. Le, Anaheim, CA (US)

(72) Inventor: Travis Q. Le, Anaheim, CA (US)

( * ) Notice: Subject to any disclaimer, the term of this patent is extended or adjusted under 35 U.S.C. 154(b) by 155 days.

(21) Appl. No.: 13/937,407

(22) Filed: Jul. 9, 2013

(51) Int. Cl.
G06K 15/00 (2006.01)
G06Q 20/20 (2012.01)

(52) U.S. Cl.
CPC .................. *G06Q 20/202* (2013.01)

(58) Field of Classification Search
USPC .................................. 235/380, 383
See application file for complete search history.

(56) References Cited

U.S. PATENT DOCUMENTS

| 6,738,749 | B1 | 5/2004 | Chasko | |
|---|---|---|---|---|
| D524,038 | S | 7/2006 | Leung | |
| 7,137,550 | B1 | 11/2006 | Petite | |
| 7,797,192 | B2 | 9/2010 | Mitchell et al. | |
| 2005/0165651 | A1 | 7/2005 | Mohan | |
| 2007/0129610 | A1* | 6/2007 | Squilla | 600/300 |
| 2011/0024495 | A1 | 2/2011 | Anderson | |
| 2011/0246372 | A1* | 10/2011 | Zloth et al. | 705/75 |
| 2014/0191707 | A1* | 7/2014 | Carreon et al. | 320/107 |

* cited by examiner

Primary Examiner — Daniel Hess

(57) ABSTRACT

A point of sale transaction device facilitates secure point of sale transactions. The device includes a housing. A processor and display are each coupled to the housing. A female universal serial bus port and camera are each coupled to the housing and operationally coupled to the processor. A power source is electrically coupled to the processor, the display, and the camera. A data storage device extrinsic to the housing has account data for processing a payment transaction. A male universal serial bus port on the data storage device selectively engages to the female universal serial bus port for providing access to the account data by the processor. A router is operationally coupled to the processor for processing a payment transaction with an extrinsic funds account.

6 Claims, 3 Drawing Sheets

POINT OF SALE TRANSACTION DEVICE

BACKGROUND OF THE DISCLOSURE

Field of the Disclosure

The disclosure relates to transaction devices and more particularly pertains to a new transaction device for facilitating secure point of sale transactions.

SUMMARY OF THE DISCLOSURE

An embodiment of the disclosure meets the needs presented above by generally comprising a housing. A processor and display are each coupled to the housing. A female universal serial bus port and camera are each coupled to the housing and operationally coupled to the processor. A power source is electrically coupled to the processor, the display, and the camera. A data storage device extrinsic to the housing has account data for processing a payment transaction. A male universal serial bus port on the data storage device selectively engages to the female universal serial bus port for providing access to the account data by the processor. A router is operationally coupled to the processor for processing a payment transaction with an extrinsic funds account.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
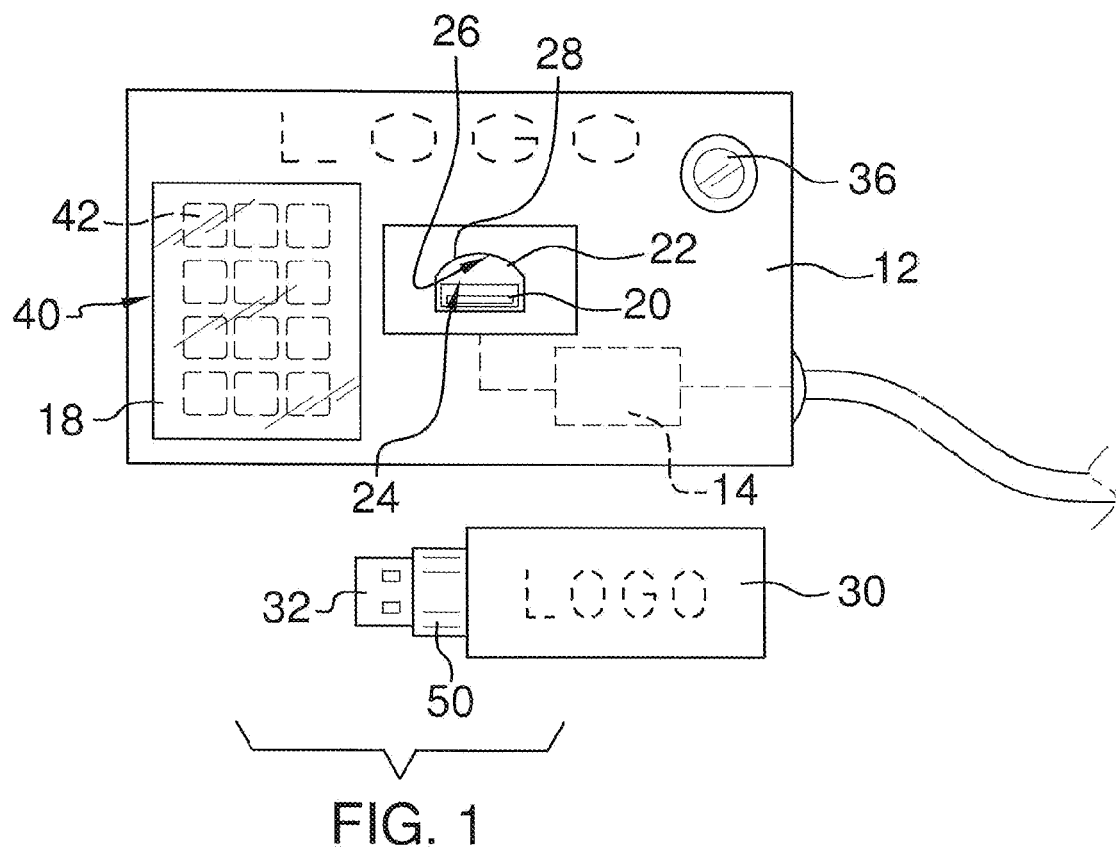
FIG. 1 is a top view of a point of sale transaction device according to an embodiment of the disclosure.
Figure 2:
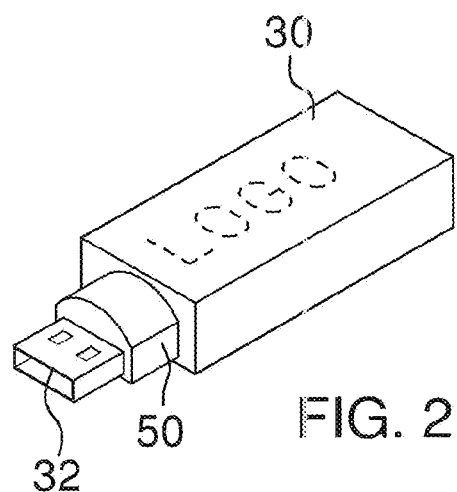
FIG. 2 is a front top side perspective view of an embodiment of the disclosure.
Figure 3:
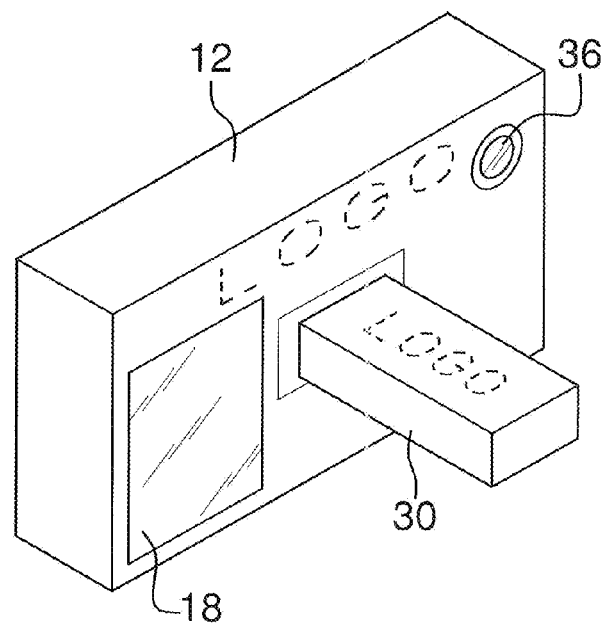
FIG. 3 is a top front side perspective view of an embodiment of the disclosure in use.
Figure 4:
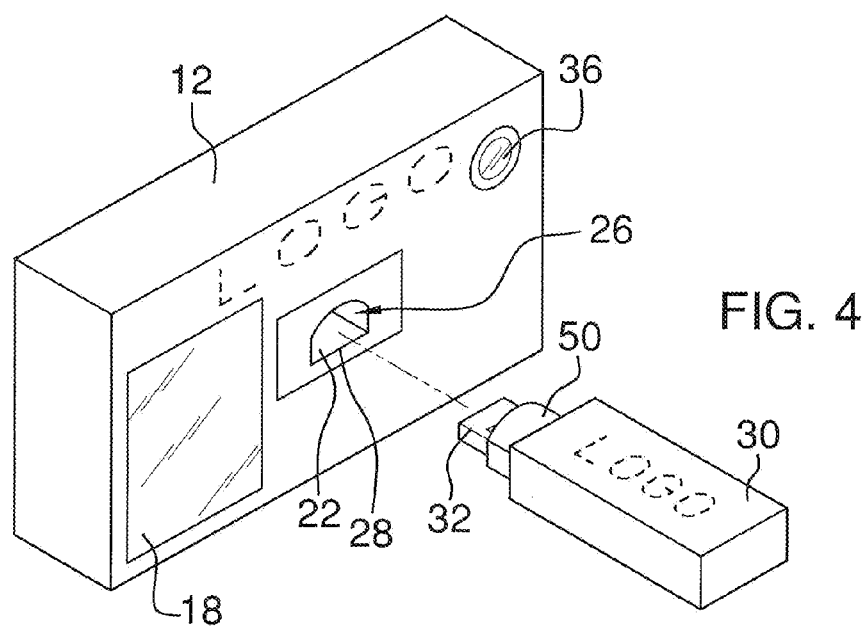
FIG. 4 is a partially exploded top front side perspective view of an embodiment of the disclosure.
Figure 5:
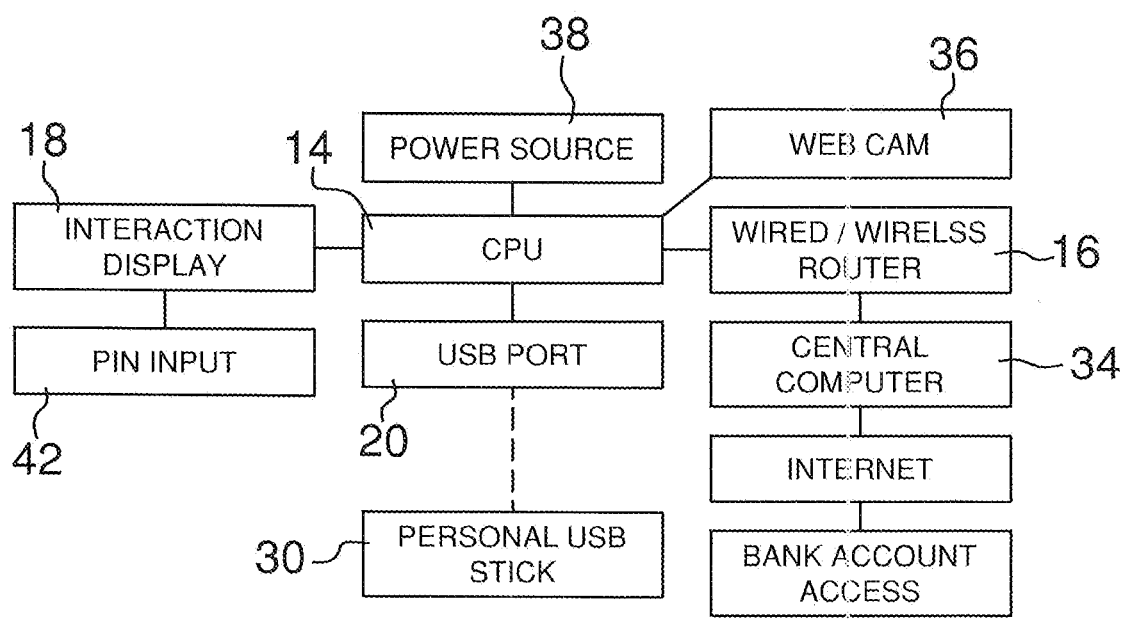
FIG. 5 is a schematic view of an embodiment of the disclosure.

With reference now to the drawings, and in particular to FIGS. 1 through 5 thereof, a new transaction device embodying the principles and concepts of an embodiment of the disclosure and generally designated by the reference numeral 10 will be described.

As best illustrated in FIGS. 1 through 5, the point of sale transaction device 10 generally comprises a housing 12 and a processor 14 coupled to and positioned in the housing 12. A router 16 is operationally coupled to the processor 14. Thus, the processor 14 is configured for processing a payment transaction from an extrinsic funds account such as a consumer checking or savings account at a bank. A display 18 is coupled to the housing 12. The display 18 is operationally coupled to the processor 14 to display information facilitating the payment transaction.

A female universal serial bus port 20 is coupled to the housing 12. The female universal serial port is operationally coupled to the processor 14. A perimeter wall 22 defines a cavity 24 extending into the housing 12. The female universal serial bus port 20 is positioned in the cavity 24. The perimeter wall 22 has an outer portion 26 extending between the female universal serial bus port 20 and an outer edge 28 of the cavity 24. A data storage device 30 is provided such as a jump drive or the like. The data storage device 30 has account data for processing the payment transaction. A male universal serial bus port 32 is coupled to and extends from the data storage device 30. The male universal serial bus port 32 is selectively engageable to the female universal serial bus port 20 for providing access to the account data by the processor 14. The data storage device 30 has a peripheral wall section 50 positioned proximate the male universal serial bus port 32 wherein the peripheral wall section 50 is positioned adjacent to the outer portion 26 of the perimeter wall 22 when the male universal serial bus port 32 is coupled to the female universal serial bus port 20. A shape of the outer portion 26 of the perimeter wall 22 is complimentary to the peripheral wall 50 of the data storage device 30 and may be distinctive to restrict access to the female universal serial bus port 20 except for data storage devices 30 issued by an associated source. A logo or other indicia may be provided on the data storage device 30 as a promotional device for the business at the point of sale. Alternatively, the port 20 may be unobstructed and readily accessible to any complimentary data device port. Additional information to secure the transaction may be communicated through coupling the data storage device 30 to the processor 14 such that the transaction is processed by connection of the data storage device 30 to the processor 14 without additional security actions being taken.

A central computer 34 is extrinsic to the housing 12 and may be operationally coupled to the processor 14. A place of business may then employ a plurality of housings 12 and processors 14 operationally coupled to and coordinated by the central computer 34.

A camera 36 may be coupled to the housing 12. The camera is operationally coupled to the processor 14 and the router 16 wherein the camera 36 is configured for providing visual communication with a bank to facilitate bank account access from a remote location such as the point of sale outside the bank. The camera 36 may be used to record sales transactions for security purposes as well. A power source 38 is electrically coupled to the processor 14, the display 18, and the camera 36.

An input mechanism 40 may be coupled to the housing 12. The input mechanism 40 is operationally coupled to the processor 14 to input identity verification data for facilitating secure transactions. The display 18 may be interactive such that the input mechanism 40 may be a keypad 42 incorporated into the display 18. The input identity verification data may be a personal access code known only to the user who can authorize the bank transaction.

In use, a person may carry the data storage device 30 on their person and authorize a bank transaction to make payment at a point of sale by engaging the male universal serial bus port 32 to the female universal serial bus port 20 and performing any necessary interactions through the input mechanism 40 to authorize the bank transaction.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A point of sale transaction device comprising:
   a housing;
   a processor coupled to and positioned in said housing;
   a display coupled to said housing, said display being operationally coupled to said processor;
   a female universal serial bus port coupled to said housing, said female universal serial port being operationally coupled to said processor;
   a camera coupled to said housing, said camera being operationally coupled to said processor;
   a power source electrically coupled to said processor, said display, and said camera; and
   a data storage device, said data storage device having account data for processing a payment transaction;
   a male universal serial bus port coupled said data storage device, said male universal serial bus port being selectively engageable to said female universal serial bus port for providing access to said account data by said processor;
   a router operationally coupled to said processor, wherein said processor is configured for processing a payment transaction with an extrinsic funds account;
   a perimeter wall defining a cavity extending into said housing, said female universal serial bus port being positioned in said cavity, said perimeter wall having an outer portion extending between said female universal serial bus port and an outer edge of said cavity; and
   said data storage device having a peripheral wall section positioned proximate said male universal serial bus port wherein said peripheral wall section is positioned adjacent to said outer portion of said perimeter wall when said male universal serial bus port is coupled to said female universal serial bus port, a shape of said outer portion of said perimeter wall being complimentary to said peripheral wall of said data storage device.

2. The device of claim 1, further comprising a central computer, said central computer being extrinsic to said housing, said processor being operationally coupled to said central computer.

3. The device of claim 1, further comprising an input mechanism coupled to said housing, said input mechanism being operationally coupled to said processor to input identity verification data.

4. The device of claim 3, further comprising said input mechanism being a keypad incorporated into said display and said input identity verification data being a personal access code.

5. The device of claim 1, further comprising said camera being operationally coupled to said processor and said router wherein said camera is configured for providing visual communication with a bank to facilitate bank account access from a remote location relative to the bank.

6. A point of sale transaction device comprising:
   a housing;
   a processor coupled to and positioned in said housing;
   a router operationally coupled to said processor, wherein said processor is configured for processing a payment transaction from an extrinsic funds account;
   a display coupled to said housing, said display being operationally coupled to said processor;
   a female universal serial bus port coupled to said housing, said female universal serial port being operationally coupled to said processor;
   a camera coupled to said housing, said camera being operationally coupled to said processor, said camera being operationally coupled to said processor and said router wherein said camera is configured for providing visual communication with a bank to facilitate bank account access from a remote location relative to the bank;
   a power source electrically coupled to said processor, said display, and said camera;
   a data storage device, said data storage device having account data for processing a payment transaction;
   a male universal serial bus port coupled said data storage device, said male universal serial bus port being selectively engageable to said female universal serial bus port for providing access to said account data by said processor;
   a central computer, said central computer being extrinsic to said housing, said processor being operationally coupled to said central computer;
   an input mechanism coupled to said housing, said input mechanism being operationally coupled to said processor to input identity verification data, said input mechanism being a keypad incorporated into said display and said input identity verification data being a personal access code; and
   a perimeter wall defining a cavity extending into said housing, said female universal serial bus port being positioned in said cavity, said perimeter wall having an outer portion extending between said universal serial bus port and an outer edge of said cavity, said data storage device having a peripheral wall section positioned proximate said male universal serial bus port wherein said peripheral wall section is positioned adjacent to said outer portion of said perimeter wall when said male universal serial bus port is coupled to said female universal serial bus port, a shape of said outer portion of said perimeter wall being complimentary to said peripheral wall of said data storage device.

* * * * *